United States Patent [19]

Cole et al.

[11] Patent Number: 4,922,472

[45] Date of Patent: May 1, 1990

[54] APPARATUS FOR INDUCING ELLIPTICALLY POLARIZED SHEAR WAVES IN AN EARTH MEDIUM

[75] Inventors: Jack H. Cole; John S. Gergely; Robert T. Baumel, all of Ponca City; John E. Strecker, Tonkawa, all of Okla.

[73] Assignee: Conoco Inc., Ponca City, Okla.

[21] Appl. No.: 205,623

[22] Filed: May 31, 1988

Related U.S. Application Data

[63] Continuation of Ser. No. 102,277, Sep. 28, 1987, abandoned, which is a continuation of Ser. No. 897,442, Aug. 18, 1986, abandoned.

[51] Int. Cl.⁵ ............................................. G01V 1/09
[52] U.S. Cl. ..................................... 367/189; 181/114; 367/75
[58] Field of Search ............... 181/104, 106, 108, 111, 181/112, 113, 114, 116, 117, 118, 119, 121, 401; 367/48, 49, 75, 143, 189, 190; 73/663, 667, 672; 74/64, 87; 310/81

[56] References Cited

U.S. PATENT DOCUMENTS

| | | | |
|---|---|---|---|
| 3,280,935 | 10/1966 | Brown | 367/189 |
| 3,578,081 | 5/1971 | Bodine | 181/106 |
| 3,587,774 | 6/1971 | Bemrose et al. | 181/401 X |
| 4,164,982 | 8/1979 | Draney | 172/40 |
| 4,218,924 | 8/1980 | Fortunko et al. | 73/642 |
| 4,286,332 | 8/1981 | Edelmann | 181/119 X |
| 4,321,981 | 3/1982 | Waters | 367/189 X |
| 4,492,285 | 1/1985 | Fair et al. | 181/401 X |
| 4,542,487 | 9/1985 | Benzing et al. | 367/48 X |
| 4,605,089 | 8/1986 | Kravchenko et al. | 181/401 X |
| 4,631,964 | 12/1986 | Sprunt et al. | 73/594 |
| 4,639,905 | 1/1987 | Goodloe | 181/401 X |
| 4,683,558 | 7/1987 | Karner | 367/189 |
| 4,709,362 | 11/1987 | Cole | 367/189 |

OTHER PUBLICATIONS

S. Hayashi, "A New Dynamic Control 4-Moment Vibration Generator", Meiden Rev (Inted), Japan, Ser. No. 63, No. 3, 1981, pp. 32-36.

Primary Examiner—Brian S. Steinberger

[57] ABSTRACT

The present invention relates to a method for generation of elliptically polarized shear waves in an earth medium using two shear wave vibrators engaged to the earth medium in cross-polarized attitude and driven at sweep rates having variable phase displacement.

6 Claims, 2 Drawing Sheets

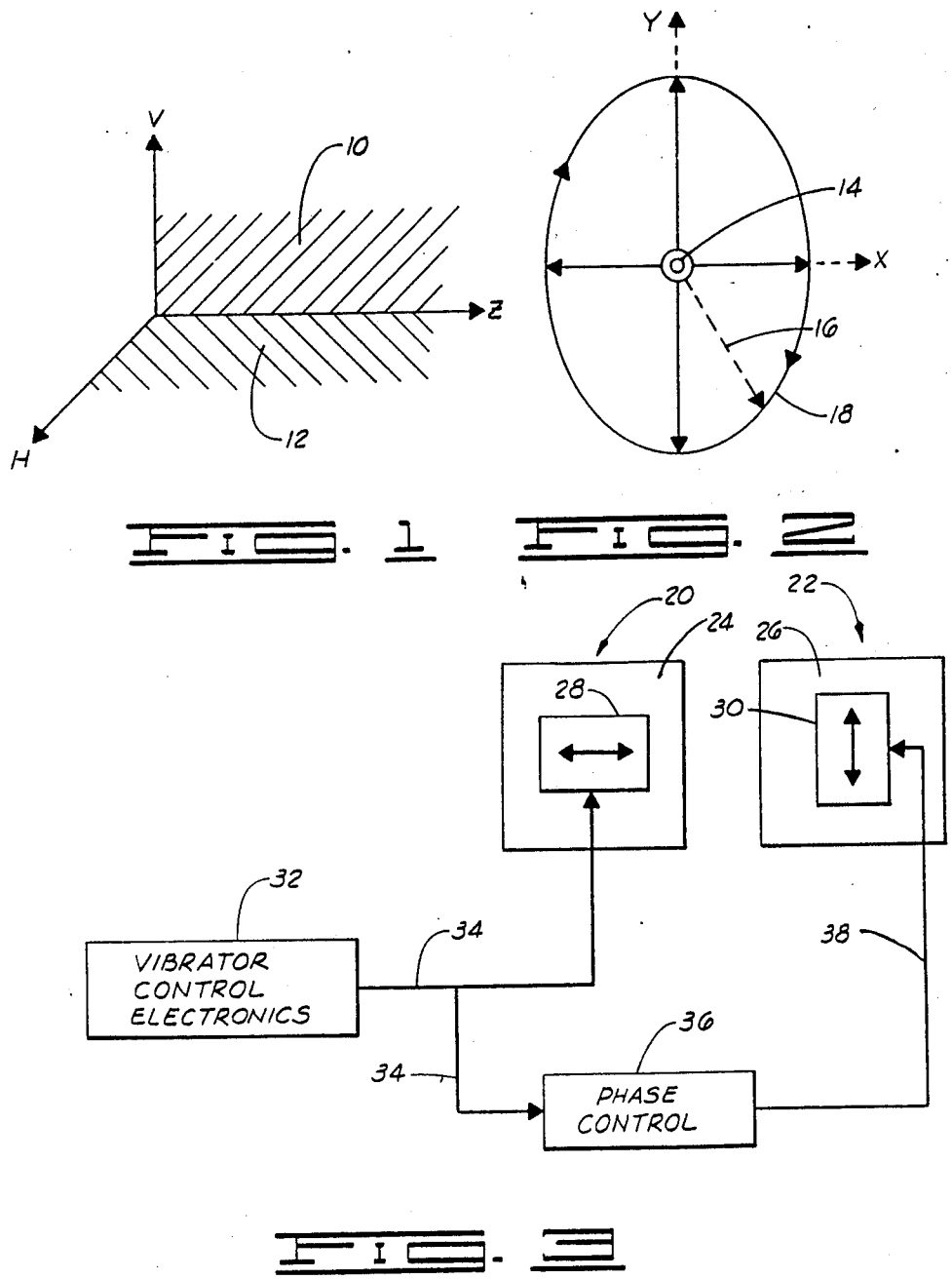

"APPARATUS FOR INDUCING ELLIPTICALLY POLARIZED SHEAR WAVES IN AN EARTH MEDIUM

This is a continuation of co-pending application Ser. No. 102,277 filed on Sept. 28, 1987, which is a continuation of Ser. No. 897,442, filed Aug. 18, 1986, both abandoned.

CROSS-REFERENCE TO RELATED APPLICATION

The present invention is related to the general subject matter of ellipsoidal shear wave seismometry as is disclosed in copending continuation U.S. patent application Ser. No. 07/166,761, entitled "Method of Seismic Exploration Using Elliptically Polarized Shear Waves", and Ser. No. 07/207935 entitled "Apparatus for Generating Elliptically Polarized Shear Waves", each having the same effective filing date.

BACKGROUND OF THE INVENTION

1. Field of the Invention

The invention relates generally to seismic shear wave generation apparatus and, more particularly, but not by way of limitation, it relates to specific apparatus and combinations of apparatus for inducing elliptically polarized shear waves in an earth medium.

2. Description of the Prior Art

Applicants know of no prior art that would be directly in point as regards the present invention. There has been prior discussion relative to the use of polarized shear waves, but there has not been a recognition of elliptically polarized shear waves and their possible employ in various seismic sounding schemes to increase intelligence recovery and enhance interpretability of data. It has been known that seismic shear waves in all probability do carry more information in their signal form than compressional waves due to the fact that there are at least two primary planes of polarization, i.e. horizontal and vertical shear waves, but heretofore no attention has been directed to angular relationships of seismic shear energy and the possibility of orderly elliptically polarized shear waves that may carry still additional amounts of information about the properties of refracting, reflecting and other affecting earth materials.

SUMMARY OF THE INVENTION

The present invention is directed primarily to method and apparatus of generating elliptically polarized shear waves in an earth medium by simultaneously generating shear waves at two juxtaposed positions in 90° shear plane displacement. Thus, shear wave vibrators of shear horizontal and shear vertical relative orientation are operated in juxtaposition and the control signal phase relationship is further adjusted to result in a summation or resultant elliptically polarized shear wave in the earth medium. Control phase and amplitude adjustments may effect a wide variety of circular, elliptical or plane relationships for subsequent detection and processing to provide information of particular subterrain.

Therefore, it is an object of the invention to provide an easily derived elliptically polarized shear wave source.

It is also an object of the present invention to provide a heavy duty elliptically polarized shear wave source that is economical and reliable in operation.

It is still further an object of the present invention to provide a scheme wherein conventional seismic shear wave vibrations may be utilized through simple field maneuvering to provide an elliptically polarized seismic shear wave source.

Finally, it is an object of the invention to provide a seismic source for use with orthogonal detectors to provide a greater volume of data return in any of vertical seismic profiling, 3-D or linear seismic surveying or the like.

Other objects and advantages of the invention will be evident from the following detailed description when read in conjunction with the accompanying drawings which illustrate the invention.

BRIEF DESCRIPTION OF THE DRAWINGS

FIG. 1 is a graphic illustration of horizontal and vertically polarized shear wave relationships;

FIG. 2 is a graphic illustration of elliptically polarized shear wave relationships as viewed against the direction of wave propagation;

FIG. 3 is a block diagram illustrating oppositely aligned seismic shear wave vibrators and control circuitry;

DETAILED DESCRIPTION OF THE INVENTION

Figure 4:
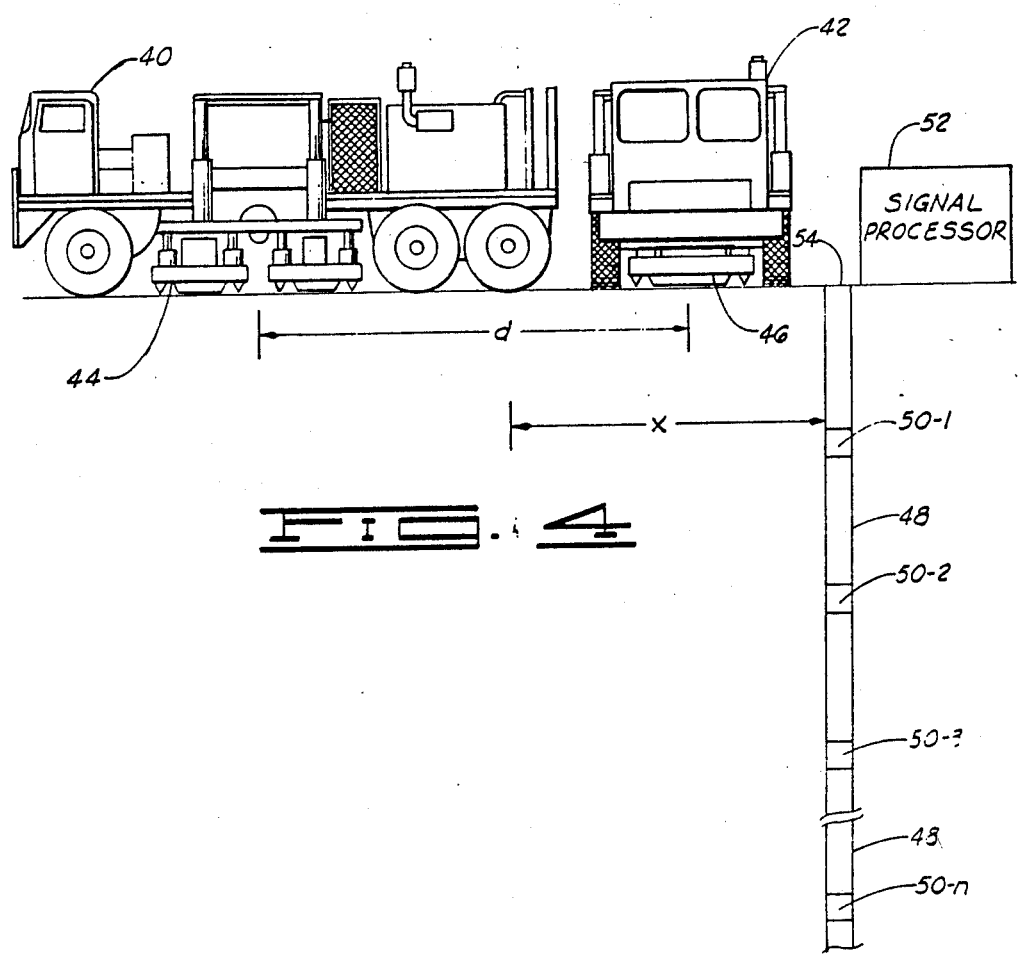
FIG. 4 is an idealized view of an earth section with borehole and combinant dual vibrator seismic source on the surface.

In terms of elastic wave ray theory, direction of polarization is generally defined as the direction of vibration of particles in the acoustic medium. In seismic practice, and particle motion in an earth medium, compressional waves effect a particle vibration direction that is coaxial with the ray path of energy propagation. For horizontal shear and vertical shear wave motion, the particle vibration paths are at right angles to the direction of propagation. Thus, referring to FIG. 1, the plane containing the vibration direction and the propagation direction is called the plane of polarization. The plane 10 would be a vertical shear plane and, in like manner, the plane 12 would be defined as a horizontal shear plane, each viewed in relation to the direction of propagation z.

Horizontal polarized shear waves (SH) and vertically polarized shear waves (SV) have been known and utilized in seismic prospecting for a long number of years. The specific properties as to velocity and other propagation constants in relation to the more well-known compressional waves have been well documented in the literature. Many plane polarized shear wave sounding techniques are utilized in the field today for any of borehole logging, vertical seismic profiles, section and 3-D surveys and the like.

There has been no prior use or apparent knowledge of the value of a more specific type of shear wave polarization that may be termed an elliptical polarization wherein the particle displacement vector in a plane perpendicular to the propagation direction z traces out an ellipse in one cycle of vibration. With reference to FIG. 2, viewing against dot 14 (the z axis), the particle displacement vector 16 rotates in a plane that is continually transversely perpendicular to the propagation direction z as it traces out an ellipse 18 for each cycle. As the particular displacement vector 16 moves along the propagation axis z, the elliptical path 18 traces out a helix-like path in its propagation. Major and minor axes of the ellipse can be varied, as will be further described.

Particle displacement may be thought of as being composed of two components which are perpendicular to the direction of propagation. Consider two plane-polarized shear waves of the same frequency whose particle displacements are given by $$\vec{D}_x = \vec{a}_x D_1 \cos(wt - kz)$$
$$\vec{D}_y = \vec{a}_y D_2 \cos(wt - kz + \phi) \quad (1)$$

where $D_1$ and $D_2$ are displacement amplitudes, $a_x$ and $a_y$ are unit vectors in the x and y directions, respectively, and k is a propagation constant. Both waves are travelling in the z direction, but are polarized perpendicular to each other and have a phase difference $\phi$. Total displacement at any point on the z axis (assuming zero attenuation) will be given by $$\vec{D} = \vec{a}_x D_1 \cos(wt - kz) + \vec{a}_y D_2 \cos(wt - kz + \phi) \quad (2)$$

For the case where $\phi = +\pi/2$ and $z=0$, expanding the above equation will give $$\vec{D} = \vec{a}_x D_1 \cos wt - \vec{a}_y D_2 \sin wt \quad (3)$$

For the case where $D_1/D_2$ is $<1$, the resultant displacement vector traces out an ellipse with its major and minor axes coincident with the y and x axes, respectively, as shown in FIG. 2. However, if $D_1/D_2$ is $>1$, the major and minor axes of the ellipse will reverse and coincide with the respective x and y axes. Viewing into the beam or z axis 14, the vector rotates in a clockwise direction at an angular frequency w and is called a right elliptically polarized wave. If we set $\phi = -\pi/2$, the resultant vector path would trace out the same ellipse 18 except that the displacement vector 16 would sweep in the counterclockwise direction and would be termed a left elliptically polarized wave.

A special case of the elliptical relationship is when $\phi = \pm\pi/2$ and $D_1$ is equal to $D_2$, and this will cause the ellipse 18 to become circular. Again then, depending on the value of $\phi$, the wave may be right or left circularly polarized. In general, $D_1$ need not equal $D_2$, and $\phi$ may assume values other than $\pm\pi/2$. When $\phi$ is not equal to $\pm\pi/2$, the major and minor ellipse axes will be rotationally displaced and not coincident with the x and y axes of the propagation coordinates. Horizontal, vertical or transverse linear polarizations would also be subsets of the elliptical polarization structure.

FIG. 3 illustrates a set-up wherein a pair of existing shear wave vibrators may be oriented in cross-polarized relationship to effect input to the earth of an elliptically polarized shear wave. Thus, the shear wave vibrators 20 and 22 are disposed in juxtaposition, as close as possible, with respective baseplates 24, 26 suitably coupled to the earth surface such that the vibrator elements 28 and 30 operate in cross-polarized orientation. The azimuthally cross-polarized vibrators 20 and 22 are then further operated 90° out of phase with each other thereby to set up an elliptically polarized shear wave resultant in the earth medium beneath the coupling point.

A standard type of vibrator control electronics 32 may be utilized to develop the requisite control sweep signal of predetermined frequency, amplitude and duration, and this output control signal is applied via lead 34 to drive the first plane polarized shear wave vibrator 20. This control signal on lead 34 is further processed through phase control circuitry 36 for application on lead 38 to drive the displaced-phase, cross-polarized vibrator 22. Shear wave outputs as induced into the earth medium from the phase displaced vibrators then meld into what is effectively seen as an elliptically polarized shear wave, and this energy may then be detected by three-component (orthogonal) seismic detectors.

Actually, field testing has been carried out with respect to the present invention using the standard Advance 1, Model 4 Seismic Vibrator Electronics as is available from Pelco Electronics Corp. of Ponca City, Okla., i.e. the vibrator control electronics 32. Then, a slight modification, identified as phase control 36, is made to shift the phase of the output on lead 34 by 90° for application to drive the phase-displaced shear wave vibrator 22.

It has been found that the phase displaced drive control can be easily effected by a slight modification of the Advance 1 type of control electronics. The modification is simple and readily made in the field as it is merely necessary to provide a single wire jumper across a portion of a High/Low frequency switch in the control system. Thus, in the phase control section E of the Advance 1 system, a wire jumper short across the "LOW FREQ" switch connecting connector P72, PIN 8 with module E7-4, PIN 2 effects a 90° phase shift of any output sweep signal. This modification allows for only one 90° phase shift by reversing one side of the switch without changing the other, and has the effect of changing the output of the vibrator by 90° as compared to an unmodified set of electronics. This is but a single option as it is indeed a simple matter for the skilled artisan to provide the requisite 90° displaced control signals to the paired, cross-polarized vibrators.

Initial testing of the elliptically polarized shear wave concept using the dual vibrator generation was carried out using a field set-up generally similar to that of FIG. 4. Two center-mounted shear wave vibrator trucks 40 and 42 were positioned closely together and at right angular orientation in order to position shear wave vibrators 44 and 46 in cross-polarized attitude. The vibrators 44 and 46 were displaced by a distance d which was essentially negligible as regards the setting up of elliptically polarized particle displacement and the relatively longer distance downward along the vertical profile of borehole 48. A plurality of orthogonal detectors 50-1 through 50-n were positioned in equal spacing downward along borehole 48. The orthogonal detectors 50 were a three-dimensional detector in the form of a combination of seismic detectors responsive to movement in one of three orthogonal directions, and the detectors 50 were secured at twelve positions in 100 foot spacing downward along borehole 48. Data received by each of the three component geophones 50 was conducted up borehole 48 separately to signal processor 52 to provide separate recording of separate response data in the horizontal (E-W), vertical and transverse (N-S) planes.

A series of individual test procedures were conducted at a plurality of offsets x, the distance of the primary source generation point from the borehole entry 54. Thus, tests were conducted and recordings were taken from the twelve sets of three-component geophones 50 using offsets x of 40 feet, 100 feet, 175 feet, and 3,000 feet. The test procedures were successful in that they were effective to establish clearly that two cross-polarized vibrators 44, 46 would adequately simulate a large surface orbital source, subject matter of the above cross-referenced applications. Data detected and recorded in each of the three-dimensions downward along borehole 48 bears out such simulation as the separately recorded and processed seismic data for each of the detection planes provided existence of the elliptically polarized seismic shear wave. Each of the orthogonal detectors sees, instantaneously, a vibration component that is compressional, a component that is shear horizontal and a component that is shear vertical, and further processing, correlation and comparison of the individual signals as regards velocity and/or position along borehole 48 bears out the relationship proving existence of the elliptically polarized shear wave.

Figure 5:
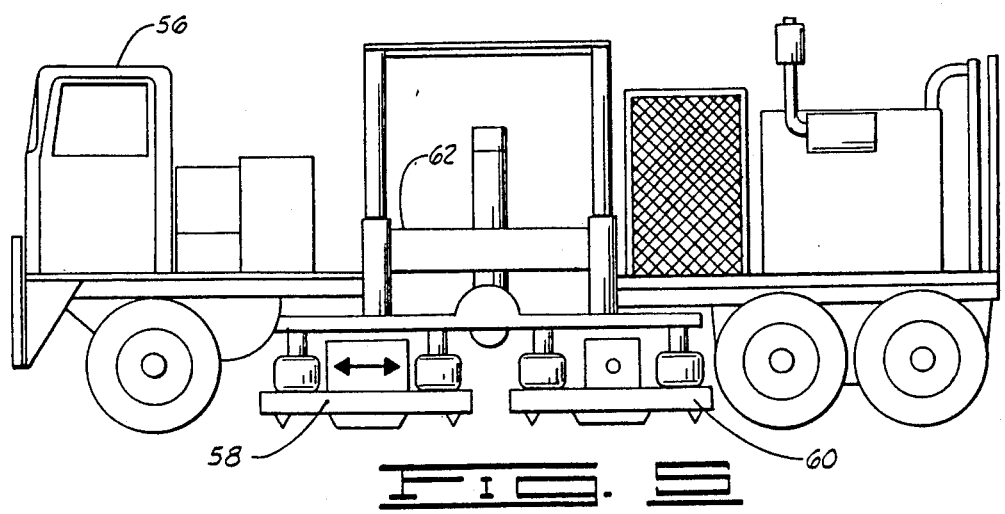
FIG. 5 is a side view in elevation of a vibrator carrier vehicle with two center-mounted vibrators in horizontal-vertical shear orientation.

The test set up of FIG. 4 indicates that a wide latitude of mechanical construction features might be utilized in constructing a utilitarian elliptically polarized shear wave vibrator for field use. As shown in FIG. 5, a carrier vehicle 56, again providing for center-mounting of vibrators, may be adapted to carry two vibrators in 90° cross-polarization. The vibrators 58 and 60 may be contained on such as a common jack assembly 62 in either tandem or lateral juxtaposition so that the vibrators can be utilized in composite by earth coupling and subsequent vibration generation in cross-polarized orientation. Thus, vibrator 58 would induce a shear horizontal component while vibrator 60 induces a shear vertical component at 90° phase-displaced electronic control and input energy to the earth medium results in an elliptically polarized shear wave. It is also contemplated that such carrier-mounted structures will allow for super-position of the geometric centers of vibrators as wherein earth coupling surfaces are concentric or the like.

In the initial test configuration, as shown in FIG. 4, both vibrators were set at equal drive levels and generated only circularly polarized shear waves; however, elliptically polarized shear waves are easily generated by altering the drive levels to different values. In addition, handedness of the polarization is easily reversed, if desired, and the directions of ellipse axes can be arbitrarily selected by adjustment of sweep rate. Specific seismic detection schemes, both surface and downhole, may be set up which rely on the fact that the nature of the elliptical polarization, e.g. ellipse eccentricity, may vary with the angle of the ray path relative to source vertical.

The foregoing discloses a novel combination of shear wave vibrators which may be oriented and phase-controlled to induce an elliptically polarized shear wave in an earth medium. While the dual vibrator type of source is not the only type of polarized shear wave vibrator, single baseplate vibrators now being existent and capable of good operation, it may be a type of source that is capable of generating extremely high powers of elliptically polarized shear wave input into an earth medium.

Changes may be made in combination and arrangement of elements as heretofore set forth in the specification and shown in the drawings; it being understood that changes may be made in the embodiments disclosed without departing from the spirit and scope of the invention as defined in the following claims.

The embodiments of the invention in which an exclusive property or privilege is claimed are as follows:

1. Apparatus for generating elliptically polarized shear waves in an earth medium, comprising:
   first mobile shear wave vibrator means to be positioned in engagement with said earth medium at a first position;
   second mobile shear vibrator means to be positioned in engagement with said earth medium adjacent said first position and in cross-polarity to said first mobile shear wave vibrator; and
   control means for driving said first and second vibrator means at frequencies that are phase-displaced by a preselected amount to produce a resultant wave propagation in the earth medium that is an elliptically polarized shear wave.

2. Apparatus as set forth in claim 1 wherein:
   said first and second mobile shear wave vibrators are each mounted on a respective first and second carrier vehicle.

3. Apparatus as set forth in claim 1 wherein:
   said first and second mobile shear wave vibrators are each mounted on the same carrier vehicle in right angle-displaced orientation.

4. Apparatus as set forth in claim 1 wherein said control means further comprises:
   means for adjusting the relative direction of phase displacement of drive frequencies of said first and second shear wave vibrator means.

5. Apparatus as set forth in claim 1 wherein said control means further comprises:
   means controlling the relative drive levels of said first and second shear wave vibrator means.

6. Apparatus as set forth in claim 1 wherein said control means further comprises:
   means controlling the amount of phase displacement between said first and second shear wave vibrator means.

* * * * *